United States Patent
Berndtson et al.

(10) Patent No.: US 8,708,412 B2
(45) Date of Patent: Apr. 29, 2014

(54) ROUND RECLINER MECHANISM

(75) Inventors: John J. Berndtson, Grosse Pointe Woods, MI (US); David L. Robinson, Sterling Heights, MI (US); Mark D. Sullivan, Rochester Hills, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 0 days.

(21) Appl. No.: 12/855,427

(22) Filed: Aug. 12, 2010

(65) Prior Publication Data

US 2011/0025114 A1 Feb. 3, 2011

Related U.S. Application Data

(63) Continuation of application No. PCT/US2009/031255, filed on Jan. 16, 2009.

(60) Provisional application No. 61/044,162, filed on Apr. 11, 2008, provisional application No. 61/021,744, filed on Jan. 17, 2008.

(51) Int. Cl.
*B60N 2/235* (2006.01)
(52) U.S. Cl.
USPC .................................. 297/367 L; 297/367 P
(58) Field of Classification Search
USPC ........................................ 297/367 P, 367 L
See application file for complete search history.

(56) References Cited

U.S. PATENT DOCUMENTS

| | | |
|---|---|---|
| 2,941,583 A | 6/1960 | Tischler et al. |
| 3,557,633 A | 1/1971 | Frerichs |
| 3,731,342 A | 5/1973 | Cousin |
| 3,807,797 A | 4/1974 | Klingelhofer |
| 3,879,802 A | 4/1975 | Werner |
| 3,958,828 A | 5/1976 | Ishida et al. |

(Continued)

FOREIGN PATENT DOCUMENTS

| | | |
|---|---|---|
| CN | 1406788 A | 4/2003 |
| CN | 100480091 | 7/2006 |

(Continued)

OTHER PUBLICATIONS

International Search Report and Written Opinion of the International Searching Authority for International Application No. PCT/US09/31255, dated Feb. 23, 2009.

(Continued)

*Primary Examiner* — David E Allred
(74) *Attorney, Agent, or Firm* — Harness, Dickey & Pierce, P.L.C.

(57) ABSTRACT

A recliner mechanism may include a guide plate and a ratchet plate selectively rotatable relative to the guide plate. At least two pawls may be disposed between the guide plate and the ratchet plate and may be movable between a first position removed from engagement with the ratchet plate to permit relative rotation between the guide plate and the ratchet plate and a second position in contact with the ratchet plate to prevent relative rotation between the guide plate and the ratchet plate. A cam may be disposed between the guide plate and the ratchet plate and may move the at least two pawls between the first position and the second position. A control ring may be fixed to the ratchet plate and may be in selective engagement with the at least two pawls to prevent the pawls from moving from the first position to the second position.

14 Claims, 11 Drawing Sheets

(56) References Cited

U.S. PATENT DOCUMENTS

| | | |
|---|---|---|
| 4,076,309 A | 2/1978 | Chekirda et al. |
| 4,082,352 A | 4/1978 | Bales et al. |
| 4,087,885 A | 5/1978 | Gillentine |
| 4,103,970 A | 8/1978 | Homier |
| 4,143,905 A | 3/1979 | Hensel et al. |
| 4,345,792 A | 8/1982 | Shephard |
| 4,348,050 A | 9/1982 | Letournoux et al. |
| 4,457,556 A | 7/1984 | Klingelhofer |
| 4,634,181 A | 1/1987 | Pipon |
| 4,770,464 A | 9/1988 | Pipon et al. |
| 4,813,853 A | 3/1989 | Otto et al. |
| 4,836,606 A | 6/1989 | Werner |
| 4,854,191 A | 8/1989 | Nagano |
| 4,997,223 A | 3/1991 | Croft |
| 5,161,856 A | 11/1992 | Nishino |
| 5,216,936 A | 6/1993 | Baloche |
| 5,267,918 A | 12/1993 | Shiroyama |
| 5,451,096 A | 9/1995 | Droulon |
| 5,531,504 A | 7/1996 | Schmale et al. |
| 5,590,931 A | 1/1997 | Fourrey et al. |
| 5,611,599 A | 3/1997 | Baloche et al. |
| 5,622,407 A | 4/1997 | Yamada et al. |
| 5,681,086 A | 10/1997 | Baloche |
| 5,685,611 A | 11/1997 | Eguchi et al. |
| 5,692,589 A | 12/1997 | Beguin |
| 5,718,483 A | 2/1998 | Yamaguchi et al. |
| 5,749,624 A | 5/1998 | Yoshida |
| 5,755,491 A | 5/1998 | Baloche et al. |
| 5,762,400 A | 6/1998 | Okazaki et al. |
| 5,769,494 A | 6/1998 | Barrere et al. |
| 5,779,313 A | 7/1998 | Rohee |
| 5,785,386 A | 7/1998 | Yoshida |
| 5,788,325 A | 8/1998 | Ganot |
| 5,816,656 A | 10/1998 | Hoshihara et al. |
| 5,820,219 A | 10/1998 | Rohee |
| 5,871,414 A | 2/1999 | Voss et al. |
| 5,873,630 A | 2/1999 | Yoshida et al. |
| 5,881,854 A | 3/1999 | Rougnon-Glasson |
| 5,884,972 A | 3/1999 | Deptolla |
| 5,984,413 A | 11/1999 | Baloche et al. |
| 6,007,152 A | 12/1999 | Kojima et al. |
| 6,007,153 A * | 12/1999 | Benoit et al. ............. 297/378.12 |
| 6,010,191 A | 1/2000 | Calinaud et al. |
| 6,023,994 A | 2/2000 | Yoshida |
| 6,024,410 A | 2/2000 | Yoshida |
| 6,039,400 A | 3/2000 | Yoshida et al. |
| 6,082,821 A * | 7/2000 | Baloche et al. .......... 297/354.12 |
| 6,085,386 A | 7/2000 | Blanchard et al. |
| 6,092,874 A | 7/2000 | Kojima et al. |
| 6,095,608 A | 8/2000 | Ganot et al. |
| 6,102,480 A | 8/2000 | Asano |
| 6,112,370 A | 9/2000 | Blanchard et al. |
| 6,120,098 A | 9/2000 | Magyar et al. |
| 6,142,569 A | 11/2000 | Kidokoro et al. |
| 6,149,235 A | 11/2000 | Fahim |
| 6,164,723 A | 12/2000 | Ganot |
| 6,224,157 B1 | 5/2001 | Di Luccio |
| 6,253,894 B1 | 7/2001 | Schumann et al. |
| 6,296,311 B1 | 10/2001 | Bonk et al. |
| 6,312,053 B1 | 11/2001 | Magyar |
| 6,318,805 B1 | 11/2001 | Asano |
| 6,325,457 B1 | 12/2001 | Matsumoto et al. |
| 6,325,458 B1 | 12/2001 | Rohee et al. |
| 6,328,382 B1 | 12/2001 | Yamashita |
| 6,328,383 B2 | 12/2001 | Rohee et al. |
| 6,332,649 B1 | 12/2001 | Vossmann |
| 6,364,413 B1 | 4/2002 | Rohee et al. |
| 6,390,557 B1 | 5/2002 | Asano |
| 6,402,249 B1 | 6/2002 | Rohee et al. |
| 6,439,663 B1 | 8/2002 | Ikegaya |
| 6,454,354 B1 | 9/2002 | Vossmann et al. |
| 6,464,298 B1 | 10/2002 | Hansel et al. |
| 6,474,734 B1 | 11/2002 | Masuda et al. |
| 6,474,740 B1 | 11/2002 | Kondo et al. |
| 6,520,583 B1 | 2/2003 | Bonk |
| 6,554,361 B2 * | 4/2003 | Reubeuze et al. ........ 297/367 R |
| 6,561,585 B2 | 5/2003 | Cilliere et al. |
| 6,568,759 B1 | 5/2003 | Hochmuth |
| 6,575,278 B1 | 6/2003 | Schumann et al. |
| 6,609,756 B2 | 8/2003 | Kojima et al. |
| 6,609,758 B1 | 8/2003 | Lefevere |
| 6,619,744 B2 | 9/2003 | Reubeuze |
| 6,626,495 B2 | 9/2003 | Okazaki et al. |
| 6,629,733 B2 | 10/2003 | Matsuura et al. |
| 6,634,713 B2 | 10/2003 | Nonomiya et al. |
| 6,640,952 B2 | 11/2003 | Baloche et al. |
| 6,641,217 B2 | 11/2003 | Yamada et al. |
| 6,648,414 B2 | 11/2003 | Ikegaya et al. |
| 6,666,515 B2 | 12/2003 | Asano et al. |
| 6,669,296 B2 | 12/2003 | Moriyama et al. |
| 6,669,297 B2 * | 12/2003 | Cilliere et al. ............ 297/367 R |
| 6,675,945 B2 | 1/2004 | Kim |
| 6,676,217 B2 | 1/2004 | Lange |
| 6,695,405 B2 | 2/2004 | Senseby et al. |
| 6,715,835 B2 * | 4/2004 | Hoshihara et al. ............ 297/366 |
| 6,722,738 B2 | 4/2004 | Uramichi |
| 6,726,281 B2 | 4/2004 | Baloche |
| 6,733,077 B2 | 5/2004 | Asano |
| 6,742,844 B2 | 6/2004 | Pollack |
| 6,749,263 B2 | 6/2004 | Peters |
| 6,755,471 B2 | 6/2004 | Hoshihara et al. |
| 6,758,524 B2 | 7/2004 | Kisiel |
| 6,758,525 B2 | 7/2004 | Uramichi |
| 6,769,740 B2 | 8/2004 | Yamada |
| 6,786,550 B2 | 9/2004 | Uramichi |
| 6,799,806 B2 | 10/2004 | Eppert et al. |
| 6,820,937 B1 | 11/2004 | Esaki et al. |
| 6,824,216 B2 | 11/2004 | Uramichi |
| 6,843,533 B1 | 1/2005 | Miyata et al. |
| 6,854,802 B2 | 2/2005 | Matsuura et al. |
| 6,880,887 B2 | 4/2005 | Hoshihara et al. |
| 6,883,869 B2 | 4/2005 | Liu et al. |
| 6,890,034 B2 | 5/2005 | Bonk |
| 6,908,156 B1 | 6/2005 | Park et al. |
| 6,910,737 B2 | 6/2005 | Hosokawa |
| 6,910,738 B2 | 6/2005 | Bonk |
| 6,923,504 B1 | 8/2005 | Liu et al. |
| 6,991,294 B2 | 1/2006 | Choi |
| 6,991,295 B2 | 1/2006 | Peters |
| 7,021,714 B2 | 4/2006 | Oki et al. |
| 7,021,715 B2 | 4/2006 | Umezaki |
| 7,055,906 B2 | 6/2006 | Shinozaki |
| 7,066,541 B2 | 6/2006 | Uramichi |
| 7,097,251 B2 | 8/2006 | Uramichi |
| 7,097,253 B2 | 8/2006 | Coughlin et al. |
| 7,100,986 B2 * | 9/2006 | Uramichi et al. ............. 297/366 |
| 7,100,987 B2 * | 9/2006 | Volker et al. ............. 297/367 R |
| 7,114,778 B2 | 10/2006 | Schuler et al. |
| 7,140,686 B2 | 11/2006 | Rohee |
| 7,144,082 B2 | 12/2006 | Ohba |
| 7,150,503 B2 | 12/2006 | Ohba |
| 7,159,945 B2 | 1/2007 | Eppert |
| 7,165,813 B2 | 1/2007 | Tame |
| 7,168,764 B2 | 1/2007 | Reubeuze et al. |
| 7,188,905 B2 | 3/2007 | Ham |
| 7,195,318 B2 | 3/2007 | Cha et al. |
| 7,201,447 B2 | 4/2007 | Yamada |
| 7,204,555 B2 | 4/2007 | Thiel |
| 7,222,916 B2 | 5/2007 | De Wilde et al. |
| 7,222,919 B2 | 5/2007 | Uramichi et al. |
| 7,261,379 B2 * | 8/2007 | Volker et al. ............. 297/367 R |
| 7,303,499 B2 | 12/2007 | Klindworth |
| 7,334,843 B2 | 2/2008 | Yamada et al. |
| 7,341,311 B2 | 3/2008 | Ohba |
| 7,354,109 B2 * | 4/2008 | Oki .......................... 297/367 R |
| 7,360,838 B2 | 4/2008 | Smuk |
| 7,380,882 B2 | 6/2008 | Oki |
| 7,380,883 B2 | 6/2008 | Koumura |
| 7,404,604 B2 | 7/2008 | Nag et al. |
| 7,407,230 B1 | 8/2008 | Luo et al. |
| 7,416,255 B2 | 8/2008 | Yamada et al. |
| 7,441,840 B2 | 10/2008 | Yamada et al. |
| 7,458,639 B2 * | 12/2008 | Thiel et al. ................ 297/367 R |
| 7,461,898 B2 | 12/2008 | Kojima |

(56) References Cited

U.S. PATENT DOCUMENTS

| | | | |
|---|---|---|---|
| 7,475,945 B2 | 1/2009 | Reubeuze et al. | |
| 7,478,881 B2 | 1/2009 | Leconte | |
| 7,517,021 B2 | 4/2009 | Wahls et al. | |
| 7,552,971 B1* | 6/2009 | Tarusawa et al. | 297/367 P |
| 7,563,049 B2 | 7/2009 | Peters | |
| 7,571,963 B2 | 8/2009 | Peters et al. | |
| 7,578,556 B2 | 8/2009 | Ohba et al. | |
| 7,588,294 B2 | 9/2009 | Matsumoto et al. | |
| 7,614,700 B2* | 11/2009 | Peters | 297/367 R |
| 7,648,204 B2 | 1/2010 | Oki | |
| 7,669,931 B2 | 3/2010 | Tarusawa et al. | |
| 7,677,667 B2 | 3/2010 | Peters et al. | |
| 7,703,852 B2* | 4/2010 | Wahls et al. | 297/367 R |
| 7,722,121 B2* | 5/2010 | Fujioka et al. | 297/367 L |
| 7,744,157 B2* | 6/2010 | Ishihara et al. | 297/367 P |
| 7,766,429 B2* | 8/2010 | Kuroda et al. | 297/367 P |
| 8,128,170 B2* | 3/2012 | Cha et al. | 297/367 P |
| 8,251,451 B2* | 8/2012 | Dziedzic | 297/367 P |
| 8,297,704 B2* | 10/2012 | Endo et al. | 297/367 L |
| 2002/0024246 A1 | 2/2002 | Yamada et al. | |
| 2002/0033627 A1 | 3/2002 | Hoshihara et al. | |
| 2002/0041119 A1 | 4/2002 | Kojima et al. | |
| 2002/0043852 A1* | 4/2002 | Uramichi | 297/366 |
| 2002/0043856 A1* | 4/2002 | Ikegaya | 297/367 |
| 2002/0096922 A1 | 7/2002 | Villaroel et al. | |
| 2002/0096923 A1 | 7/2002 | Uramichi | |
| 2002/0096924 A1 | 7/2002 | Reubeuze | |
| 2002/0096925 A1* | 7/2002 | Uramichi | 297/367 |
| 2002/0125756 A1 | 9/2002 | Asano | |
| 2002/0171280 A1 | 11/2002 | Okazaki et al. | |
| 2003/0025376 A1 | 2/2003 | Moriyama et al. | |
| 2003/0067205 A1 | 4/2003 | Eppert et al. | |
| 2003/0085603 A1 | 5/2003 | Lee et al. | |
| 2003/0155800 A1 | 8/2003 | Asano | |
| 2003/0173810 A1 | 9/2003 | Lee et al. | |
| 2003/0178879 A1 | 9/2003 | Uramichi | |
| 2003/0214165 A1 | 11/2003 | Finner et al. | |
| 2003/0230923 A1* | 12/2003 | Uramichi | 297/367 |
| 2004/0036337 A1 | 2/2004 | Hoshihara et al. | |
| 2004/0036338 A1 | 2/2004 | Lardais et al. | |
| 2004/0084945 A1 | 5/2004 | Toba et al. | |
| 2004/0145226 A1 | 7/2004 | Bonk | |
| 2004/0145227 A1 | 7/2004 | Bonk | |
| 2004/0195890 A1 | 10/2004 | Liu et al. | |
| 2005/0035640 A1 | 2/2005 | Shinozaki | |
| 2005/0073185 A1 | 4/2005 | Uramichi | |
| 2005/0082892 A1 | 4/2005 | Yamada et al. | |
| 2005/0140196 A1* | 6/2005 | Park et al. | 297/367 |
| 2005/0146187 A1 | 7/2005 | Volker et al. | |
| 2005/0156454 A1 | 7/2005 | Fast | |
| 2005/0168034 A1 | 8/2005 | Fast | |
| 2005/0231016 A1 | 10/2005 | Kojima | |
| 2005/0264076 A1 | 12/2005 | Uramichi et al. | |
| 2005/0275270 A1 | 12/2005 | Lee | |
| 2006/0012232 A1 | 1/2006 | Coughlin et al. | |
| 2006/0055222 A1 | 3/2006 | Bonk et al. | |
| 2006/0145523 A1 | 7/2006 | Yamada | |
| 2006/0170269 A1* | 8/2006 | Oki | 297/367 |
| 2006/0261657 A1 | 11/2006 | Luo et al. | |
| 2007/0024099 A1 | 2/2007 | Becker et al. | |
| 2007/0040436 A1* | 2/2007 | Oki | 297/367 |
| 2007/0040437 A1 | 2/2007 | Nagura et al. | |
| 2007/0057558 A1 | 3/2007 | Kojima | |
| 2007/0096529 A1 | 5/2007 | Kojima et al. | |
| 2007/0102982 A1 | 5/2007 | Yamada et al. | |
| 2007/0108825 A1 | 5/2007 | Yamada et al. | |
| 2007/0132294 A1 | 6/2007 | Yamada et al. | |
| 2007/0145800 A1 | 6/2007 | Thiel et al. | |
| 2007/0145801 A1 | 6/2007 | Yamada et al. | |
| 2007/0289092 A1 | 12/2007 | Rohee et al. | |
| 2008/0001458 A1 | 1/2008 | Hoshihara et al. | |
| 2008/0048478 A1* | 2/2008 | Koumura | 297/367 |
| 2008/0073961 A1 | 3/2008 | Wahls et al. | |
| 2008/0093906 A1 | 4/2008 | Gruson | |
| 2008/0093907 A1 | 4/2008 | Nag et al. | |
| 2008/0174163 A1 | 7/2008 | Kojima et al. | |
| 2008/0197687 A1 | 8/2008 | Luo et al. | |
| 2008/0203798 A1 | 8/2008 | Kienke et al. | |
| 2008/0203799 A1 | 8/2008 | Yamada | |
| 2008/0211285 A1 | 9/2008 | Ishihara et al. | |
| 2008/0231103 A1 | 9/2008 | Rohee | |
| 2008/0238171 A1 | 10/2008 | Kojima et al. | |
| 2008/0303331 A1 | 12/2008 | Heo | |
| 2009/0066138 A1 | 3/2009 | Reubeuze et al. | |
| 2009/0085391 A1* | 4/2009 | Peters et al. | 297/367 |
| 2009/0200850 A1 | 8/2009 | Heo | |
| 2009/0236892 A1 | 9/2009 | Cillierre et al. | |
| 2009/0243360 A1* | 10/2009 | Tarusawa et al. | 297/362 |
| 2009/0243361 A1* | 10/2009 | Tarusawa et al. | 297/362 |
| 2009/0243363 A1* | 10/2009 | Tarusawa et al. | 297/367 P |
| 2009/0302658 A1* | 12/2009 | Fassbender et al. | 297/367 P |
| 2010/0026071 A1 | 2/2010 | Ohba | |
| 2010/0033004 A1 | 2/2010 | Reubeuze | |
| 2010/0096895 A1* | 4/2010 | Nonomiya | 297/344.15 |
| 2010/0109408 A1 | 5/2010 | Ohba | |
| 2010/0127546 A1* | 5/2010 | Dziedzic | 297/367 R |
| 2010/0139425 A1 | 6/2010 | Schulz et al. | |
| 2010/0194164 A1 | 8/2010 | Cha et al. | |
| 2010/0194165 A1 | 8/2010 | Iguchi | |
| 2010/0308635 A1* | 12/2010 | Tame et al. | 297/367 P |
| 2010/0319482 A1* | 12/2010 | Fassbender et al. | 74/577 R |
| 2011/0012414 A1* | 1/2011 | Yamada et al. | 297/367 P |
| 2011/0304189 A1* | 12/2011 | Wahls | 297/367 R |
| 2012/0126603 A1* | 5/2012 | Peters | 297/367 P |
| 2012/0169104 A1* | 7/2012 | Stilleke et al. | 297/362 |
| 2012/0223562 A1* | 9/2012 | Assmann et al. | 297/362 |
| 2012/0228915 A1* | 9/2012 | Holzhueter et al. | 297/367 P |

FOREIGN PATENT DOCUMENTS

| | | | | |
|---|---|---|---|---|
| DE | 1676502 U | 5/1954 | | |
| DE | 19814225 A1 | 10/1998 | | |
| DE | 19918864 A1 | 10/1999 | | |
| DE | 19904300 C1 | 8/2000 | | |
| DE | 10105282 A1 | 8/2002 | | |
| DE | 10305407 A1 | 8/2004 | | |
| EP | 0694434 A1 | 1/1996 | | |
| EP | 1676502 A2 | 7/2006 | | |
| GB | 2449383 A * | 11/2008 | | B60N 2/235 |
| JP | 2002-119349 A | 4/2002 | | |
| JP | 2002119352 A | 4/2002 | | |
| JP | 2003000379 A | 1/2003 | | |
| JP | 2004081345 A | 3/2004 | | |
| JP | 2004245942 A | 9/2004 | | |
| JP | 2005304717 A | 11/2005 | | |
| JP | 2006014999 A | 1/2006 | | |
| JP | 2004379630 A1 | 4/2008 | | |
| WO | 02079000 A1 | 10/2002 | | |
| WO | WO 2007034683 A1 * | 3/2007 | | |
| WO | 2007115601 A1 | 10/2007 | | |
| WO | 2008046004 A1 | 4/2008 | | |
| WO | WO 2009146524 A1 * | 12/2009 | | B60N 2/235 |
| WO | 2010048383 A1 | 4/2010 | | |

OTHER PUBLICATIONS

First Office Action for Chinese Application No. 200980102127.1, mailed Sep. 13, 2012. English translation provided by AIPT Patent, Trademark & Law Office.

Notification of Reason(s) for Refusal for Japanese Patent Application No. 2010-543276, dated Sep. 5, 2012. English translation provided by Maeda & Suzuki.

International Search Report for International Application No. PCT/US09/33067, dated Feb. 29, 2012.

Written Opinion of the International Searching Authority for International Application No. PCT/US09/33067, dated Feb. 29, 2012.

(56) References Cited

OTHER PUBLICATIONS

First Office Action regarding Chinese Patent Application No. 200980103781.4, dated Mar. 7, 2012. English translation provided by AIPT Patent Trademark & Law Office.

Non-Final Office Action in U.S. Appl. No. 13/099,594, mailed Oct. 24, 2012.

Second Office Action regarding Chinese Patent Application No. 200980103781.4, dated Jan. 28, 2013. Eglish translation provided by AIPT Patent Trademark & Law Office.

Second Office Action for Chinese Application No. 200980102127.1, mailed Apr. 15, 2013. English translation provided by AIPT Patent, Trademark & Law Office.

Final Office Action in U.S. Appl. No. 13/099,594, mailed May 7, 2013.

Third Office Action regarding Chinese Patent Application No. 200980103781.4, dated Aug. 13, 2013. English translation provided by AIPT Patent, Trademark & Law Office.

\* cited by examiner

ROUND RECLINER MECHANISM

CROSS-REFERENCE TO RELATED APPLICATIONS

This application is a continuation of International PCT Application No. PCT/US2009/031255, filed Jan. 16, 2009, which claims the benefit of U.S. Provisional Application No. 61/021,744, filed on Jan. 17, 2008, and U.S. Provisional Application No. 61/044,162, filed on Apr. 11, 2008. The entire disclosures of the above applications are incorporated herein by reference.

FIELD

The present disclosure relates to a recliner mechanism for a seat and more particularly to a round recliner mechanism for a seat.

BACKGROUND

The statements in this section merely provide background information related to the present disclosure and may not constitute prior art.

Vehicle seats typically include a recliner mechanism that allows for selective adjustment of an angular position of a seatback relative to a seat bottom. Such seats typically include at least one recliner mechanism disposed at a base of the seatback to maintain torsional stiffness of the seatback when the seatback is in a locked position. Because each recliner mechanism maintains the seatback in the locked position, each recliner mechanism, if multiple mechanisms are employed, must be moved from a locked state into an unlocked state to permit movement of the seatback relative to the seat bottom. Because a single release mechanism is generally employed to release one or more recliner mechanisms, each recliner mechanism must be synchronized to lock and release simultaneously.

SUMMARY

This section provides a general summary of the disclosure, and is not a comprehensive disclosure of its full scope or all of its features.

A recliner mechanism is provided and may include a guide plate and a ratchet plate selectively rotatable relative to the guide plate. At least two pawls may be disposed between the guide plate and the ratchet plate and may be movable between a first position removed from engagement with the ratchet plate to permit relative rotation between the guide plate and the ratchet plate and a second position in contact with the ratchet plate to prevent relative rotation between the guide plate and the ratchet plate. A cam may be disposed between the guide plate and the ratchet plate and may move the at least two pawls between the first position and the second position. A control ring may be fixed to the ratchet plate and may be in selective engagement with the at least two pawls to prevent the pawls from moving from the first position to the second position.

A seat assembly is provided and may include a seat bottom and a seatback rotably supported by the seat bottom. A recliner mechanism may be disposed proximate to a junction of the seat bottom and the seatback to selectively prevent rotation of the seatback relative to the seat bottom. The recliner mechanism may include a guide plate attached to one of the seat bottom and the seatback. A ratchet plate may be selectively rotatable relative to the guide plate and may be attached to the other of the seat bottom and the seatback. At least two pawls may be disposed between the guide plate and the ratchet plate and may be movable between a first position removed from engagement with the ratchet plate to permit relative rotation between the guide plate and the ratchet plate and a second position in contact with the ratchet plate to prevent relative rotation between the guide plate and the ratchet plate. A cam may be disposed between the guide plate and the ratchet plate to move the at least two pawls between the first position and the second position. A control ring may be fixed to the ratchet plate and may be in selective engagement with the at least two pawls to prevent the pawls from moving from the first position to the second position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
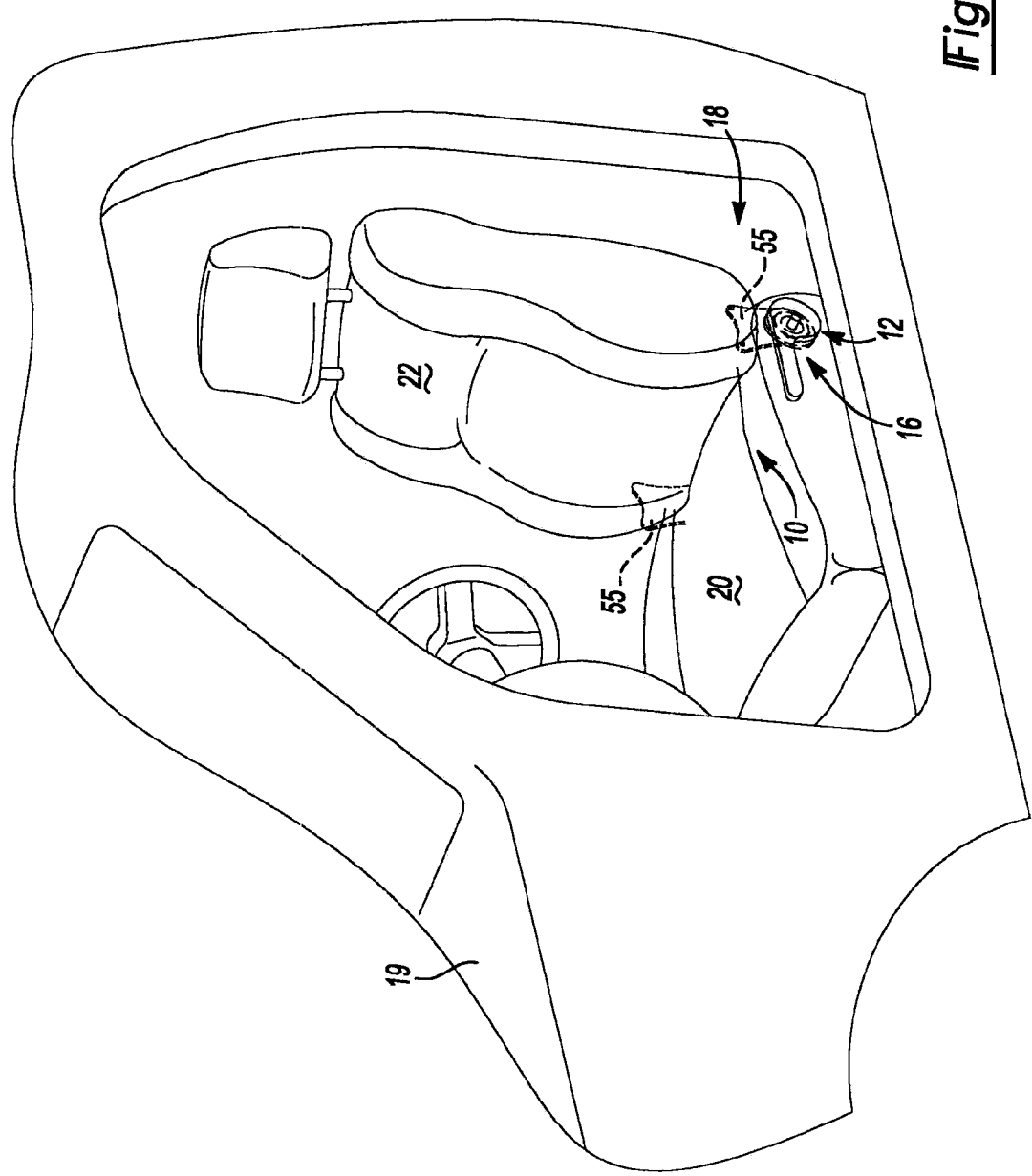
FIG. 1 is a partial perspective view of a vehicle including a seat assembly incorporating a recliner mechanism according to the principles of the present disclosure.
Figure 2:
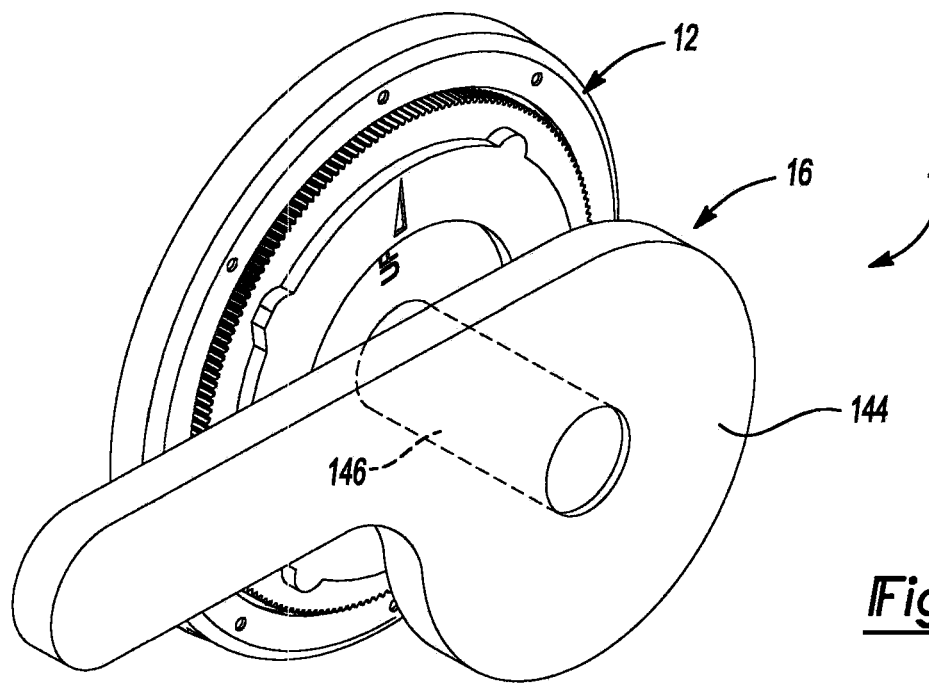
FIG. 2 is a perspective view of the recliner mechanism of FIG. 1.
Figure 4:
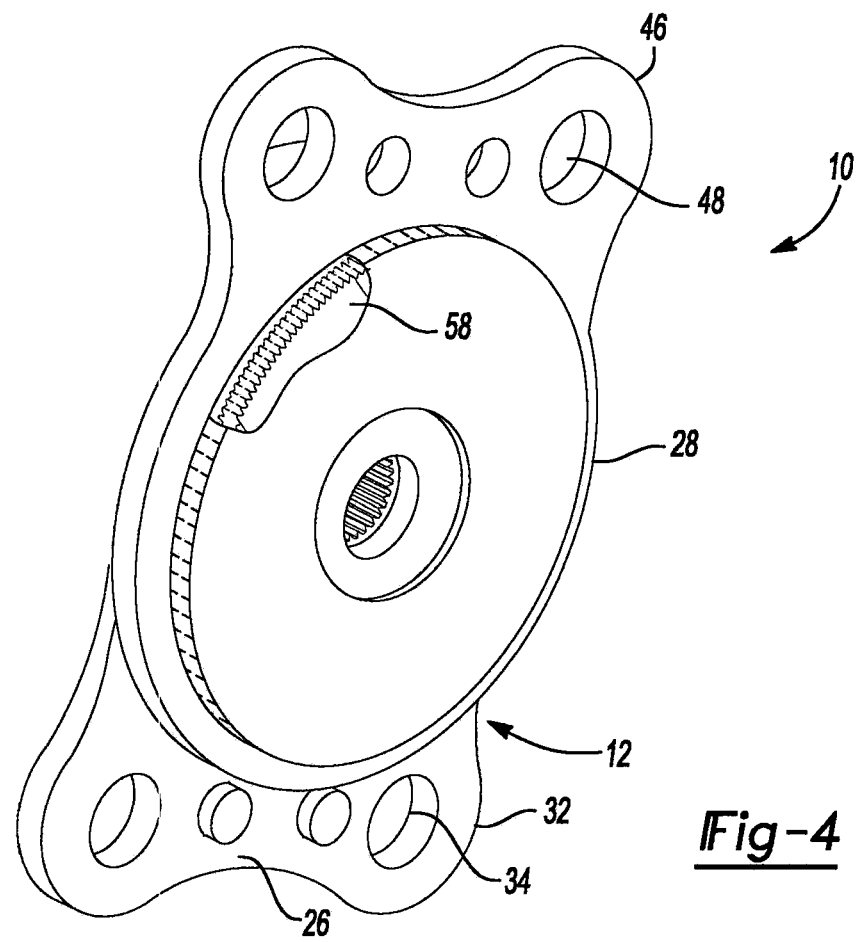
FIG. 4 is a perspective view of a recliner mechanism according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIGS. 1-9, a recliner assembly 10 is provided and includes a round-recliner mechanism 12 and an actuation mechanism 16. The recliner assembly 10 may be installed in a seat assembly 18 including a seat bottom 20 and a seatback 22, whereby the seatback 22 is selectively pivotable relative to the seat bottom 20. The seat assembly 18 may be installed in a vehicle 19, as shown in FIG. 1. The recliner mechanism 12 may selectively lock the seatback 22 relative to the seat bottom 20 in a locked state and may permit pivotable movement of the seatback 22 relative to the seat bottom 20 in an unlocked state. The recliner mechanism 12 may include a guide plate 26, a ratchet plate 28, and a locking mechanism 30.

The guide plate 26 may be a generally round, flat disk and may include a central aperture 36, and a plurality of pie-shaped wedges or bosses 38 having an outer radii or surface 40. The guide plate 26 may further include at least one hole 42 formed therethrough and disposed generally between respective bosses 38 for use in detecting portions of the locking mechanism 30 during assembly.

The outer surface 40 may include a pair of blend radii 47 flanking a central radii 49 The blend radii 47 may include a surface formed at a different pitch or angle than that of the central radii 49 and may act as a ramp to facilitate rotation of the ratchet plate 28 relative to the guide plate 26. The bosses 38 may also include an engagement surface 51 that interacts with the actuation mechanism 16 to prevent over rotation of the actuation mechanism 16 and damage to the bosses 38 and/or actuation mechanism 16 caused by such over rotation. In essence, the engagement surface 51 serves as an overtravel stop to limit rotation of the actuation mechanism 16 relative to the guide plate 26. At least one groove 53 may be formed in each boss 38 for interaction with portions of the locking mechanism 30 to facilitate movement of the locking mechanism 30 relative to the guide plate 26.

Figure 3:
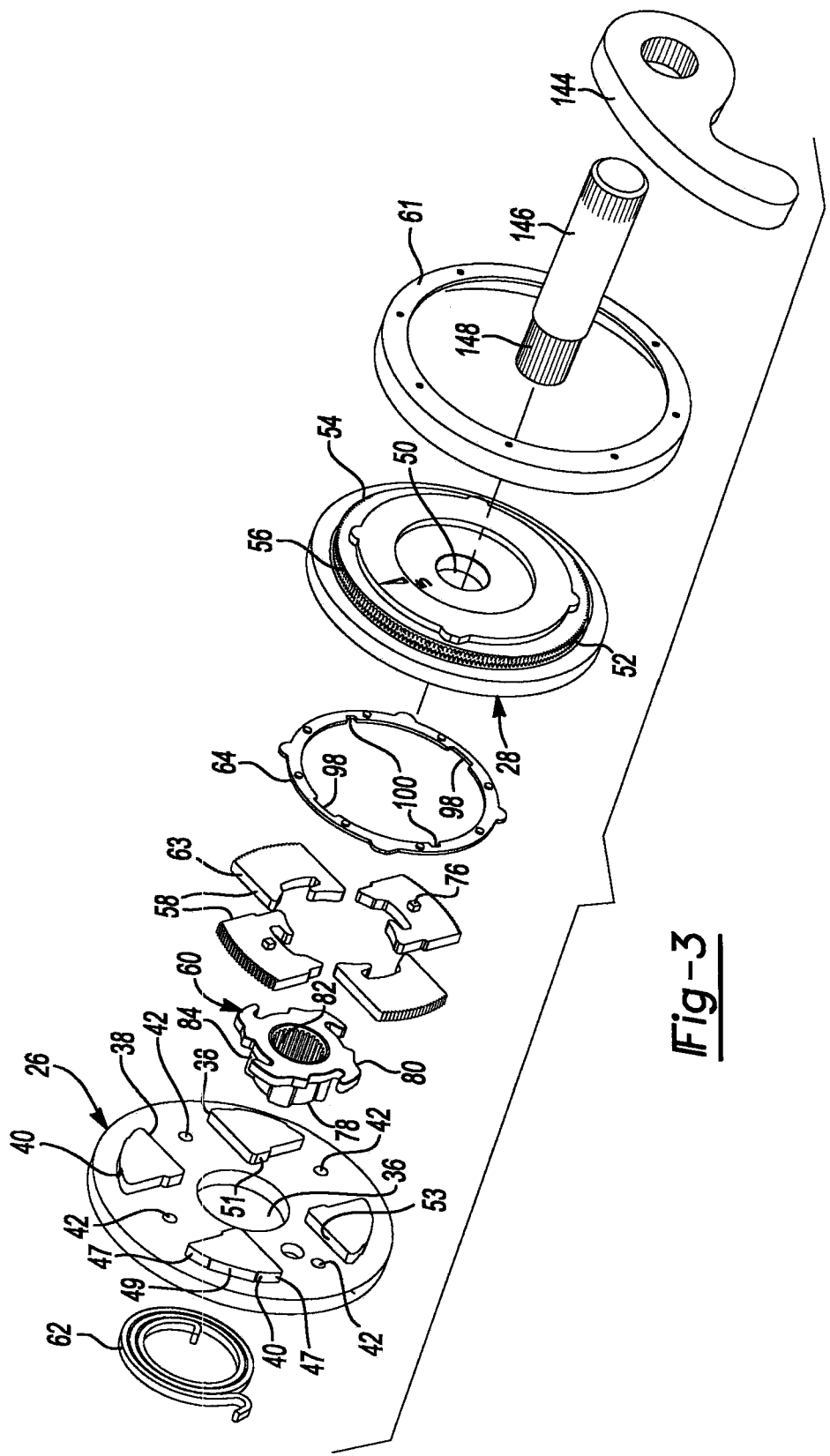
FIG. 3 is an exploded view of the recliner mechanism of FIG. 1.

The guide plate 26 is substantially symmetrical, as shown in FIG. 3. As such, the guide plate 26 is not limited to use on only an inboard or an outboard recliner mechanism 12. More specifically, the same guide plate 26 could be incorporated into a recliner mechanism 12 disposed at an outboard location of a seat assembly 18 (i.e., a right-hand mechanism) or into a recliner mechanism disposed at an inboard location of a seat assembly 18 (i.e., a left-hand mechanism). The guide plate 26 may also include at least one index mark (not shown) for alignment with a portion of the locking mechanism 30 to properly align the locking mechanism 30 relative to the guide plate 26. The index mark may be disposed at an outer surface or an inner surface of the guide plate 26 provided the mark can be aligned with the locking mechanism 30 during assembly of the recliner mechanism 12.

The ratchet plate 28 may be a generally round, flat disk and may include a central aperture 50 that supports at least a portion of the actuation mechanism 16 and a cylindrical recess 52. The cylindrical recess 52 may include a plurality of teeth 54 radially disposed on an inner diameter 56. A bracket 55 may be welded and/or otherwise suitably fixed to the seatback 22 and to the ratchet plate 28 to attach the ratchet plate 28 to the seatback 22 (FIG. 1). Alternatively, the recliner mechanism 12 could be configured such that the guide plate 26 may be fixed to the seatback 22 in a similar manner, as described above. If the guide plate 26 is fixed to the seatback 22, the ratchet plate 28 would be attached to the seat bottom 20 using a similar or same bracket 55 depending on the particular configuration of the seat assembly 18.

The ratchet plate 28 may be mounted to the guide plate 26 with the cylindrical recess 52 disposed substantially concentric with the outer radii 40 of the bosses 38. An encapsulation ring 61 having a substantially U-shaped cross-section may be disposed generally around the peripheries of the ratchet plate 28 and the guide plate 26 to couple the ratchet plate 28 to the guide plate 26. The encapsulation ring 61 may be press-fit on the ratchet plate 28 and/or welded via a suitable welding process such as, for example, a laser-welding or gas metal arc welding (GMAW) process.

Alternatively or additionally, the guide plate 26 and the ratchet plate 28 may include protruding mounting lobes 32, 46, respectively. Mounting apertures 34, 48 may be disposed on the mounting lobes 32, 46, respectively to facilitate attachment of the guide plate 26 to the seat bottom 20. Similarly, the mounting lobes 46 and mounting apertures 48 may facilitate attachment of the ratchet plate 28 to the seatback 22. While the guide plate 26 is described and shown as being attached to the seat bottom 20 and the ratchet plate 28 is described and shown as being attached to the seatback 22, the guide plate 26 could alternatively be attached to the seatback 22 and the ratchet plate 28 could be attached to the seat bottom 20.

Figure 5:
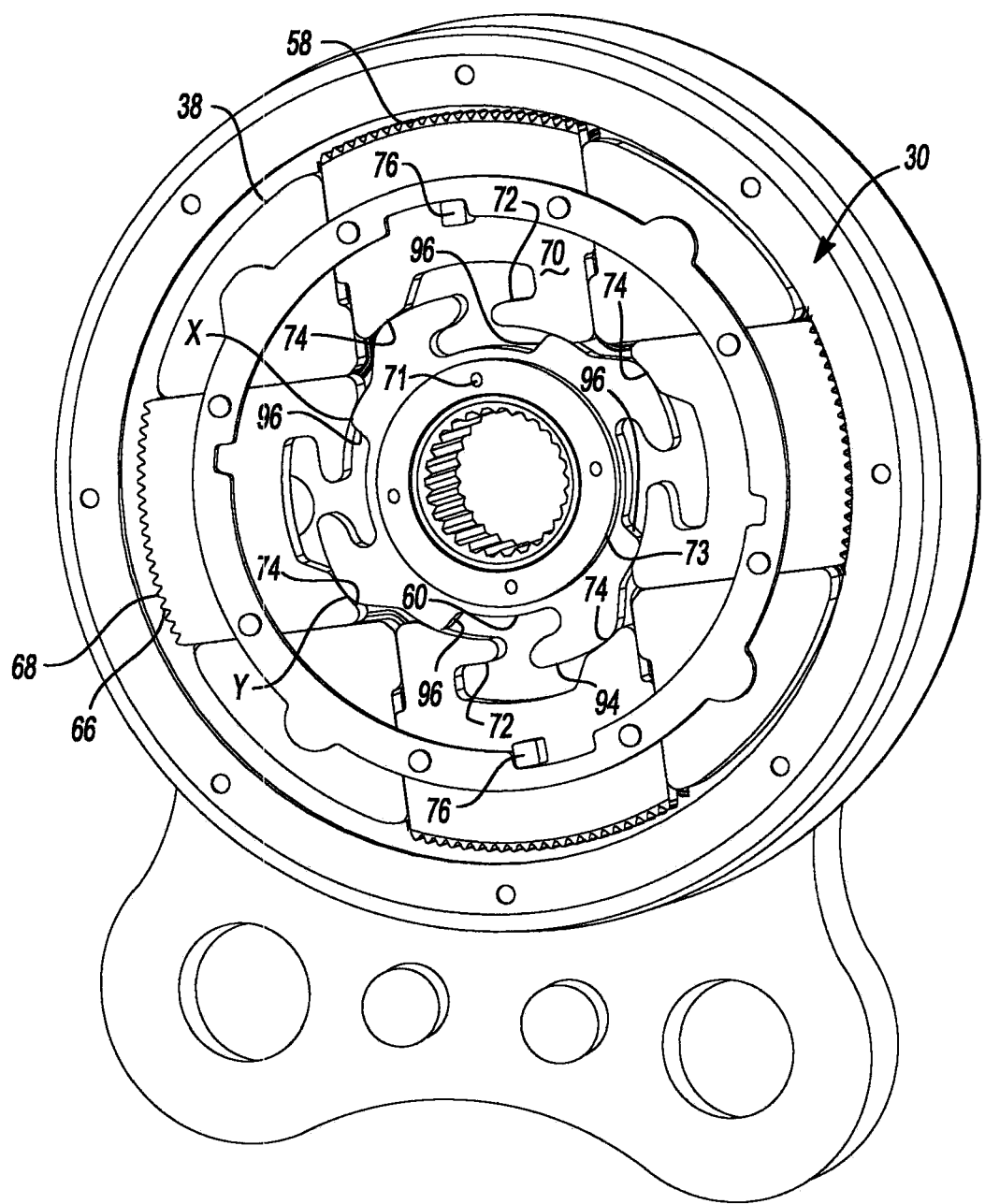
FIG. 5 is a partial perspective view of the recliner mechanism of FIG. 1 with part of a housing removed to show internal components of the recliner mechanism in a locked state.
Figure 6:
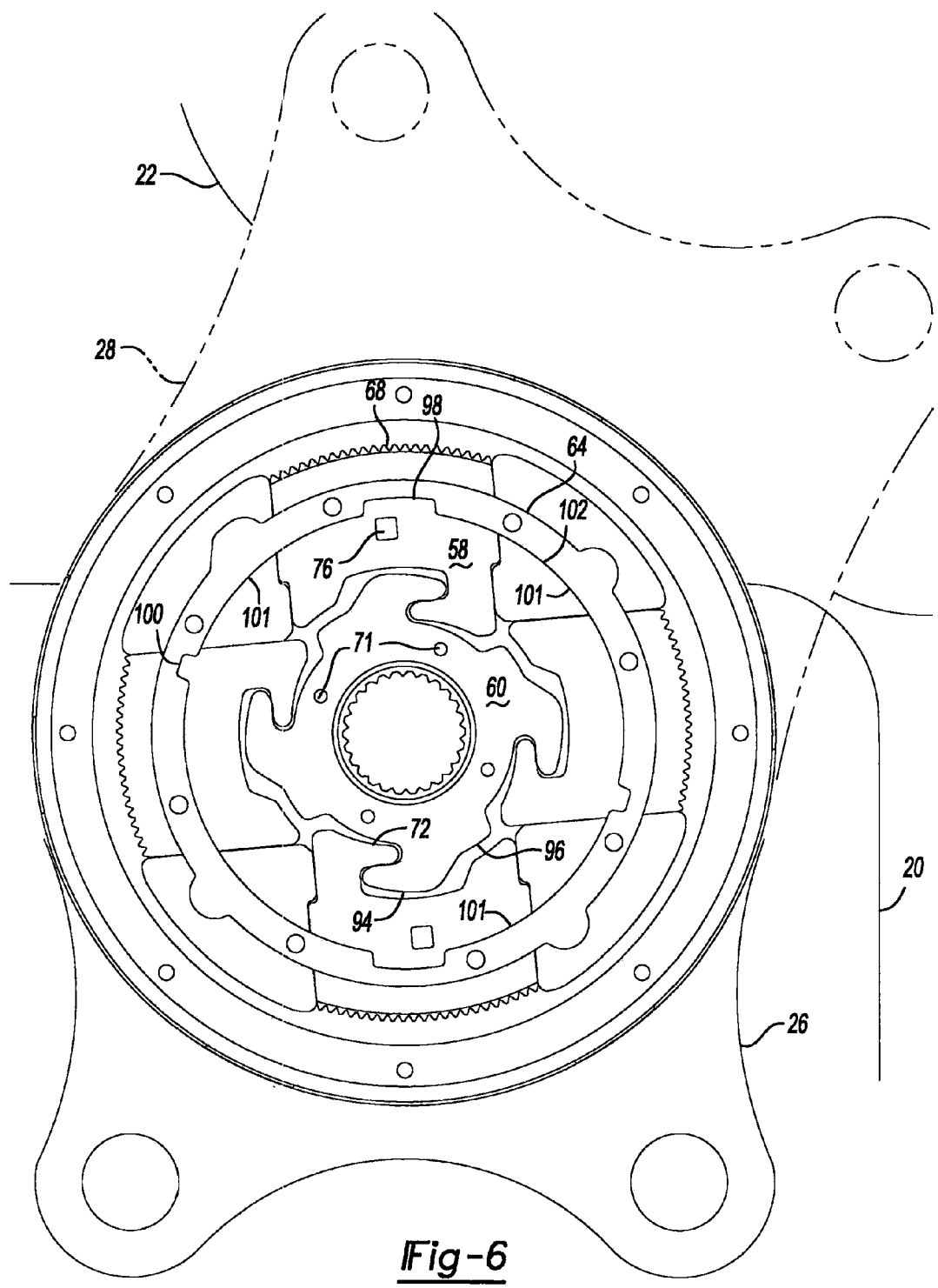
FIG. 6 is a side view of the recliner mechanism of FIG. 1 with part of a housing removed to show internal components of the recliner mechanism in an unlocked and reclined state.
Figure 7:
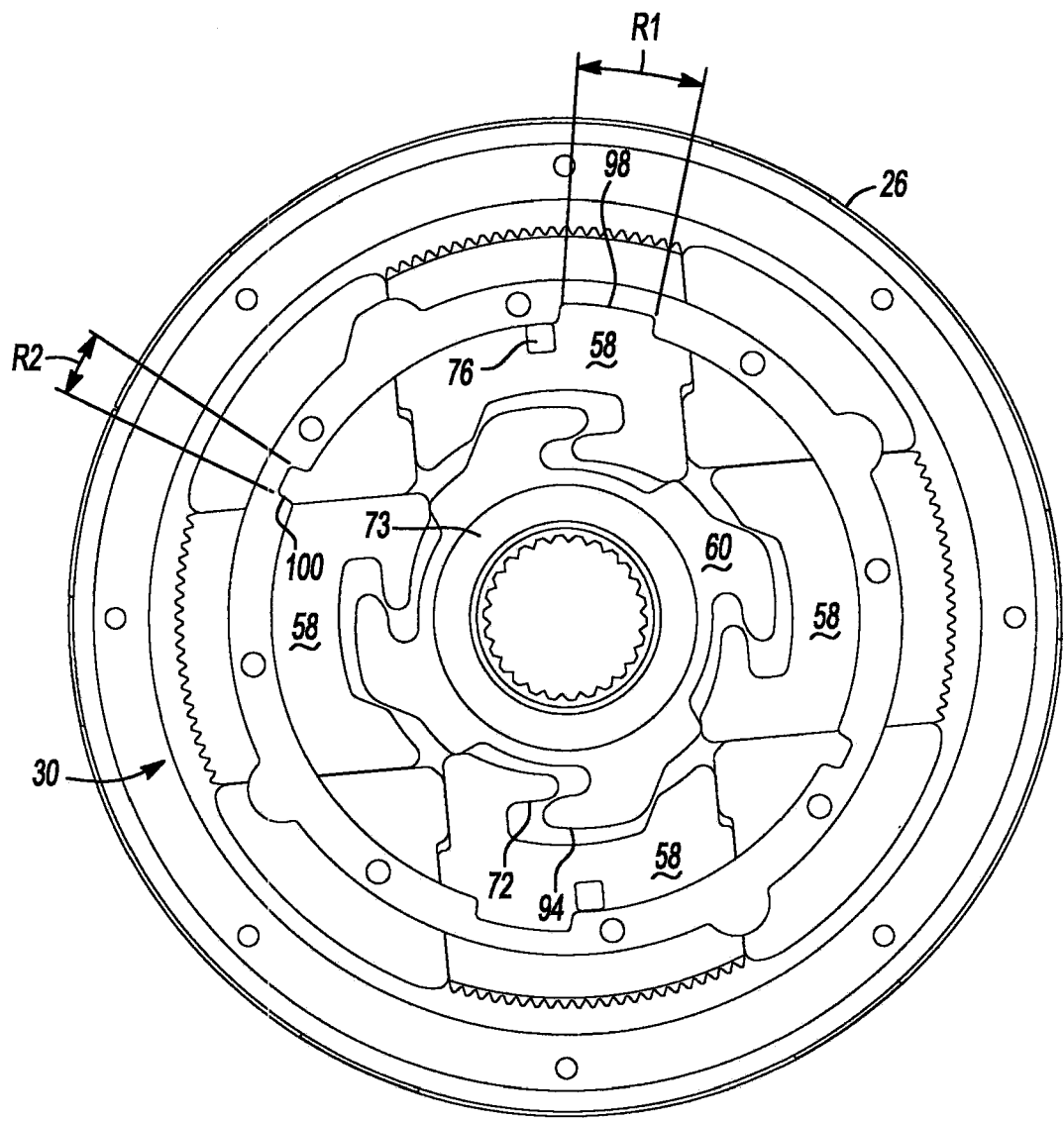
FIG. 7 is a side view of the recliner mechanism of FIG. 1 with part of a housing removed to show internal components of the recliner mechanism in a unlocked state.

The locking mechanism 30 may be mounted to the guide plate 26 and may include a plurality of pawls 58, a cam 60, a coil spring 62, and a control ring 64. The plurality of pawls 58 may be radially disposed around the central aperture 36 on the guide plate 26 and may be slidably mounted to the guide plate 26 generally between the bosses 38 (FIG. 5-7). The holes 42 of the guide plate 26 may be used during assembly of the recliner mechanism 12 to ensure that the pawls 58 are installed between the bosses 38. An edge 66 of each pawl 58 may include a plurality of teeth 68 adapted for meshing engagement with the teeth 54 of the ratchet plate 28. The edge 66 may include a generally arcuate shape to improve engagement between the pawls 58 and teeth 54 of the ratchet plate 28 when the recliner mechanism 12 is in the locked state. A portion 70 of each pawl 58 may include a latch 72 and one or more cam lobes 74 while two opposing pawls 58 may each include a post or dump boss 76 (FIG. 5).

The dump boss 76 may include a "D" shape, a square shape, or a rectangular shape, whereby a sharp edge of the D shape (i.e., at a junction of the arcuate portion of the D and the straight portion of the D), a sharp edge of the square shape, or a sharp edge of the rectangular shape allows the dump boss 76 to facilitate return of each pawl 58 to a locked position, as will be described further below. The two pawls 58 having a dump boss 76 may include a different number of teeth than the other two pawls 58 that do not include a dump boss 76. In one configuration, the pawls 58 with dump bosses 76 have 22 teeth while the pawls 58 without dump bosses 76 include twenty (20) teeth. The pawls 58 without dump bosses 76 can be installed in any orientation (i.e., can be rotated one-hundred and eighty (180) degrees about a longitudinal axis between a first orientation and a second orientation) such that the pawls 58 without dump bosses 76 can be installed in either the first orientation or the second orientation. Allowing the dump bosses 76 to be installed in either the first orientation or the second orientation simplifies assembly of the pawls 58 to the guide plate 26 and therefore simplifies the overall assembly of the recliner mechanism 12.

Each pawl 58 may also include an edge 63 that is matingly received by the groove 53 formed in the respective bosses 38 to facilitate movement of the pawls 58 relative to the bosses 38 and guide plate 26.

Figure 8:
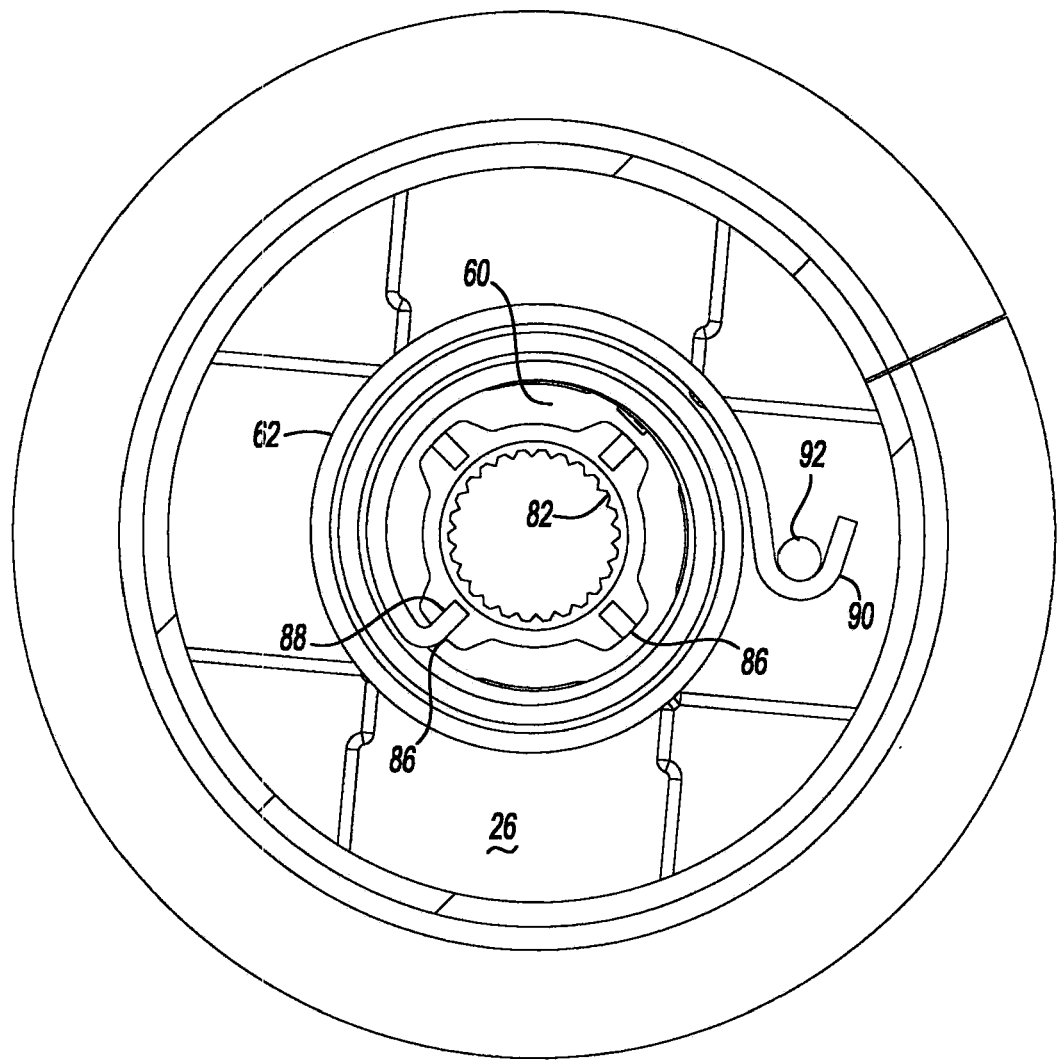
FIG. 8 is a rear side view of a coil spring disposed on a guide plate for use with the recliner mechanism of FIG. 1.

The cam 60 may include a bushing portion 78 and a generally round disk portion 80. The bushing portion 78 may be rotatably engaged with the central aperture 36 of the guide plate 26 and may include a splined inner diameter 82. The outer diameter 84 of the bushing portion 78 may include one or more slotted protrusions 86 that receive an inner end 88 of the coil spring 62 (FIG. 8). Because the coil spring 62 is attached at the inner end 88 to the bushing portion 78 and at the outer end 90 at a tab 92 disposed on the guide plate 26, the coil spring 62 biases the cam 60 in the counterclockwise direction relative to the view shown in FIG. 5. The tab 92 may be integrally formed with the guide plate 26 and may act as a spring post for attaching the coil spring 62 to the guide plate 26 and/or allowing the coil spring 62 to bias the cam 60 in the counterclockwise direction relative to the view shown in FIG. 5.

The disk portion 80 of the cam 60 may include a plurality of radial projections or latches 94 and a plurality of cam lobes 96. The radial latches 94 selectively engage the latches 72 of the pawls 58 to move the pawls 58 into the unlocked state.

The cam 60 may be formed from a powder-metal process and may include a washer feature (not labeled). The washer feature may include an increased-thickness portion extending along at least a portion of the cam 60 that serves to strengthen the cam 60 during assembly and use. The increased thickness of the cam 60 allows the cam 60 to be manufactured via a powder-metal process by reinforcing the radial latches 94 during pressing of the cam 60 and before sintering. The increased thickness also improves the overall strength of the cam 60 and radial latches 94 and, as such, prohibits fracture of the radial latches 94 during assembly and use.

The cam 60 may include a series of protruding features 71 and/or a ring 73 extending from a surface of the cam 60 adjacent to at least one of the guide plate 26 and the ratchet plate 28. In one configuration, the cam 60 may include both the protruding features 71 and the ring 73 (FIG. 5), whereby the protruding features 71 are disposed on the ring 73. While the protruding features 71 are disposed on the ring 73, the protruding features 71 could alternatively be spaced apart from the ring 73. In another configuration, the cam 60 may include only the protruding features 71 (FIG. 6). In yet another configuration, the cam 60 includes only the ring 73 (FIG. 7).

The protruding features 71 and/or ring 73 space the cam 60 from the guide plate 26 and/or ratchet plate 28 to decrease friction therebetween and to reduce viscous damping. Reducing friction and viscous dampening, allows the cam 60 to move more rapidly relative to the guide plate 26 and ratchet plate 28 and therefore allows the cam 60 to be more responsive. For example, when the seatback 22 is returned from a dumped position to a use position, the cam 60 is permitted to rotate rapidly relative to the guide plate 26 and ratchet plate 28 and, as such, permits the pawls 58 to quickly extend and engage the ratchet plate 28 to quickly return the seatback 22 to a fixed position relative to the seat bottom 20.

The cam 60 may include an index mark (not shown) for alignment with the index mark of the guide plate 26. As indicated above, alignment of the respective index marks helps ensure that the cam 60 is installed in a proper position relative to the guide plate 26 during assembly.

With reference to FIG. 7, the control ring 64 may include two home recesses 98 and two dump recesses 100 and a plurality of guide surfaces 101 disposed along the inner diameter 102 of the control ring 64. The home recesses 98 may span an angular range R1, and the dump recesses 100 may span an angular range R2. The control ring 64 may be fixedly mounted to the ratchet plate 28. The ranges R1 and R2 may be adjusted to achieve a desired range of motion of the seatback 22 relative to the seat bottom 20, thus virtually any number of ranges is possible.

Because only two of the pawls 58 include dump bosses 76, the overall travel of the seatback 22 relative to the seat bottom 20 is substantially equal to one-hundred and seventy (170) degrees. If each of the pawls 58 included a dump boss 76, the overall travel of the seatback 22 relative to the seat bottom 20 would be limited to approximately ninety (90) degrees, as additional home recesses and dump recess would need to be added to the control ring 64 to accommodate the additional dump bosses 76.

While two home recesses 98 and two dump recesses 100 are disclosed, additional recesses of varying width could also be incorporated into the control ring 64 to provide the recliner mechanism 12 with additional lock zones. For example, a recess (not shown) could be disposed between each of the home recesses 98 and the dump recesses 100 to position the seatback 22 at an angle relative to the seat bottom 20 and between a use position and a dump position to allow for quick access to an area located behind the seatback 22. The control ring 64 could be formed from the offal (i.e., scrap) of the encapsulation ring 61 given the shape of the control ring 64 and encapsulation ring 61. Forming the control ring 64 in such a fashion saves cost and time during manufacturing of the recliner mechanism 12 as two components can be formed from a single piece of material and at substantially the same time during the same process.

The actuation mechanism 16 may include a hand lever 144, which may be fixedly mounted on the end of a shaft 146. The shaft 146 may include a splined surface 148 in engagement with the splined inner diameter 82 of the bushing portion 78 of the cam 60 such that the shaft 146 is fixed for rotation with the cam 60. The shaft 146 may protrude therefrom and extend through the central apertures 36, 50 of the guide plate 26 and the ratchet plate 28, whereby the apertures 36, 50 provide rotational support to the shaft 146. The hand lever 144 may be disposed outside of the seat assembly 18 to provide access to an occupant of the seat assembly 18 and/or the vehicle 19.

With continued reference to FIGS. 1-9, operation of the recliner assembly 10 will be described. As described above, the locking mechanism 30 is mounted to the guide plate 26. The coil spring 62 rotationally biases the cam 60 in a counterclockwise direction relative to the view shown in FIG. 5. In the locked position shown in FIG. 5, the biasing force of the coil spring 62 causes the radial latch 94 and the cam lobe 96 of each cam 60 to bias the cam lobe 74 and latch 72, respectively, toward the periphery of the guide plate 26, thereby forcing the pawls 58 outward. In this position, the cam 60 exerts a force on each pawl 58 substantially at an outer edge of each pawl 58.

Sufficient movement of the pawls 58 toward the periphery of the guide plate 26 under force of the cam 60 causes the teeth 68 of the pawls 58 to extend beyond the outer radii 40 of the bosses 38 into engagement with the teeth 54 of the ratchet plate 28. The meshing engagement of the teeth 54, 68 prevents relative rotation between the guide plate 26 and the ratchet plate 28, thus locking the seatback 22 relative to the seat bottom 20 and preventing rotation therebetween. Exerting a force at two discrete locations (X, Y of FIG. 5) on each pawl 58 and at an outer or outboard edge of each pawl 58 improves the overall contact of each pawl 58 with the ratchet plate 58 and, thus, improves the ability of the pawls 58 to prevent relative rotation between the guide plate 26 and the ratchet plate 28.

A force may be applied to the hand lever 144 in a clockwise direction (relative to the view shown in FIG. 2) to rotate the shaft 146 in a clockwise direction and allow the seatback 22 to pivot relative to the seat bottom 20. As described above, the shaft 146 is rotationally fixed to the lock cam 60 via engagement of the splined surface 148 and the splined inner diameter 82. Accordingly, clockwise rotation of the shaft 146 causes the cam 60 to similarly rotate in a clockwise direction relative to the pawls 58 and the guide plate 26, overcoming the counterclockwise rotational bias of the coil spring 62. If the force applied to the hand lever 144 causes the hand lever 144 to be rotated beyond that which is required to overcome the spring bias and remove the pawls 58 from engagement with the ratchet plate 28, the cam 60 will contact the engagement surfaces 51 of the bosses 38, via the pawls 58, to prevent damage to the internal components of the recliner mechanism 12 and/or hand lever 144.

Sufficient clockwise rotation of the cam 60 forces the latches 72, 94 into engagement (FIG. 6), thereby forcing the latches 72 (and consequently the pawls 58) towards the center of the guide plate 26 against the bias of the coil spring 62. Accordingly, the teeth 54, 68 disengage, allowing the guide plate 26 to rotate relative to the ratchet plate 28. Therefore, a user may pivot the seatback 22 forward and backward relative to the seat bottom 20 as long as the hand lever 144 is held in an unlocked position. Pivoting of the seatback 22 relative to the seat bottom 20 is facilitated by the blend radii 47 of the bosses 38, as the blend radii 47 act as a ramp allowing the teeth 54 of the ratchet plate 28 to pass by the bosses 38 smoothly and without noise.

Releasing the hand lever 144 allows the coil spring 62 to bias the cam 60 towards the lock position, thereby urging the pawls 58 back into engagement with the ratchet plate 28 and locking the seatback 22 relative to the seat bottom 20.

The direction of actuation of the hand lever 144 and the direction of the rotational bias of coil spring 62 are opposite each other, but may be either in the clockwise or counterclockwise direction relative to the view shown in FIG. 6. The specific configuration may depend on the orientation of the recliner assembly 10 relative to the seat assembly 18, which may depend upon the location of the recliner mechanism 12 on the seat assembly 18.

As described above, the recliner mechanism 12 may include the control ring 64 fixedly mounted to the ratchet plate 28. The control ring 64 may allow selective locking and unlocking of the recliner mechanism 12 to pivot the seatback 22 along the angular range R1 (FIG. 7) of the home recesses 98. The control ring 64 may also allow a user to dump the seatback 22 forward without prolonged actuation of the hand lever 144.

When the dump bosses 76 of the pawls 58 are disposed within the angular range R1 of the home recesses 98 or the angular range R2 of the dump recesses 100, the pawls 58 are allowed to engage the ratchet plate 28 when the hand lever 144 is released, thereby locking the seatback 22 relative to the seat bottom 20. Therefore, a user may selectively actuate the hand lever 144 to selectively unlock the recliner mechanism 12 and pivot the seatback 22 to place the dump bosses 76 at any point along the angular range R1 of the home recesses 98. Releasing the hand lever 144 with the dump bosses 76 disposed within the home recesses 98 allows locking engagement between the pawls 58 and the ratchet plate 28.

Figure 11:
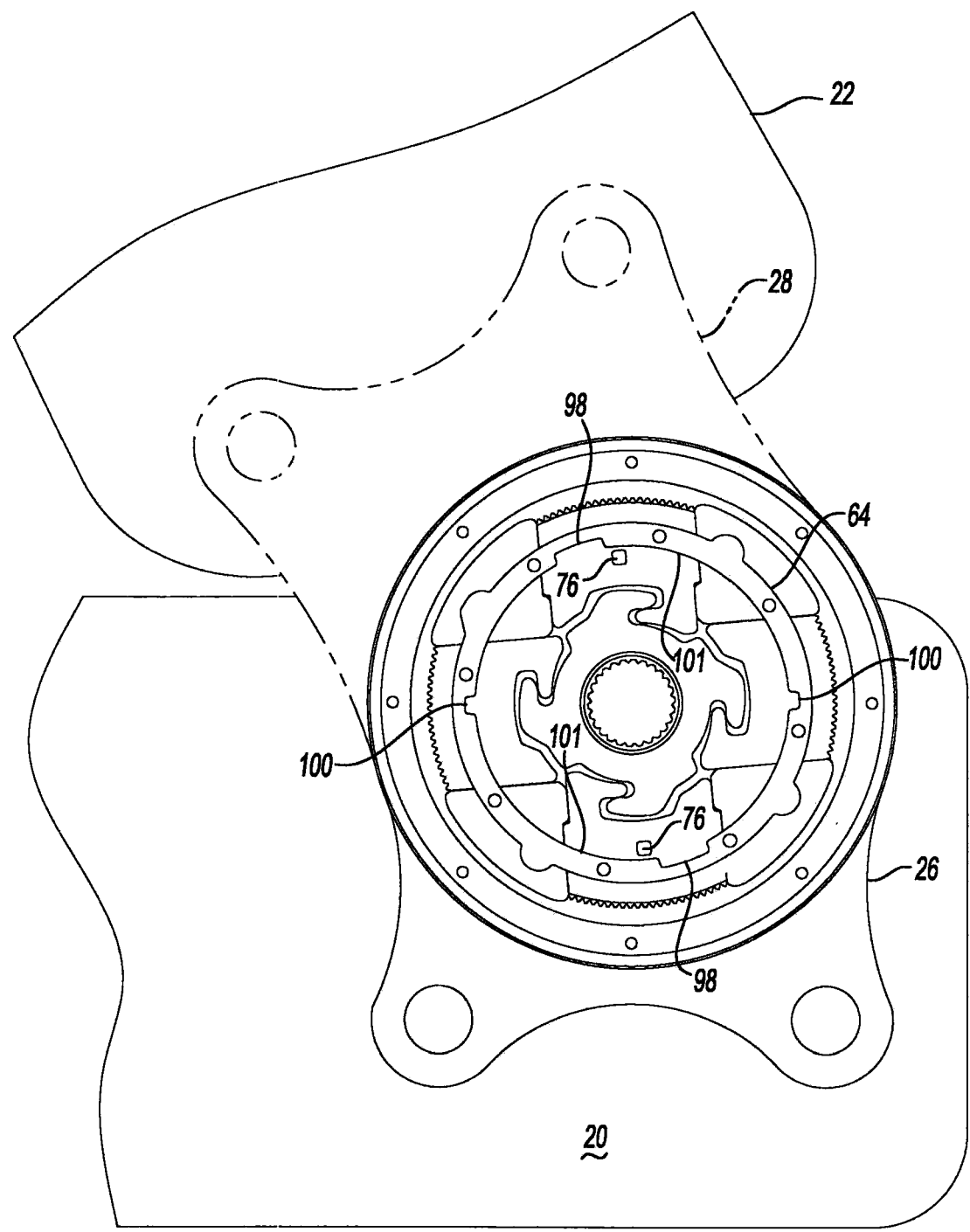
FIG. 11 is a partial side view of a seat assembly incorporating a recliner mechanism in accordance with the principles of the present disclosure in an unlocked and forward-reclining position.
Figure 12:
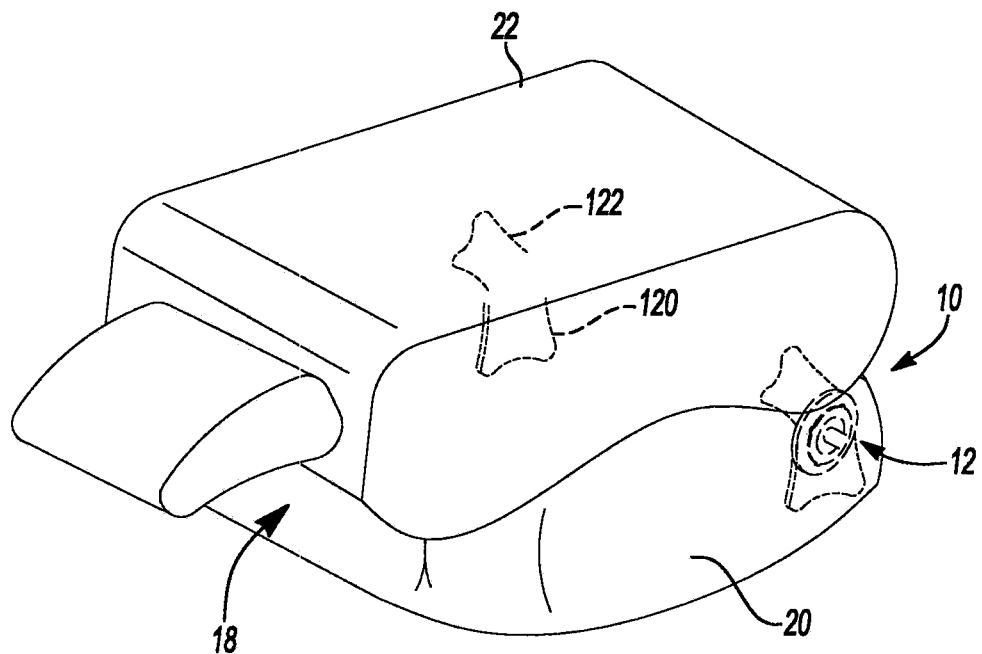
FIG. 12 is a perspective view of a seat assembly in a forward dump position and incorporating the recliner mechanism of FIG. 1.

Actuating the hand lever 144 and pivoting the seatback 22 beyond the angular range R1 places the dump bosses 76 along the guide surfaces 101 (FIG. 7). In this condition, the two pawls 58 having the dump bosses 76 are restrained in the unlocked position, thereby maintaining at least partial engagement between the latches 72 of all of the pawls 58 and the latches 94 of the cam 60 and preventing the pawls 58 from reengaging the ratchet plate 28. Preventing the pawls 58 from engaging the ratchet plate 28 (FIG. 11) allows the user to release the hand lever 144 and freely pivot the seatback 22 as the guide surfaces 101 slide against the dump bosses 76. When the seatback 22 is pivoted into the dump position (FIG. 12), the dump bosses 76 are received into the dump recesses 100, allowing the pawls 58 to be urged into engagement with the ratchet plate 28 to lock the seatback 22 in the dump position.

Dump bosses 76 disposed on two of four pawls 58 allow the combined total angular range of the recesses 98, 100 to exceed ninety degrees, and allow a greater range of motion of the seatback 22 relative to the seat bottom 20. Dump bosses 76 disposed on four pawls would restrict the range of positions of the seatback 22 relative to the seat bottom 20, whereby the pawls 58 could engage the ratchet plate 28, as described above.

Figure 10:
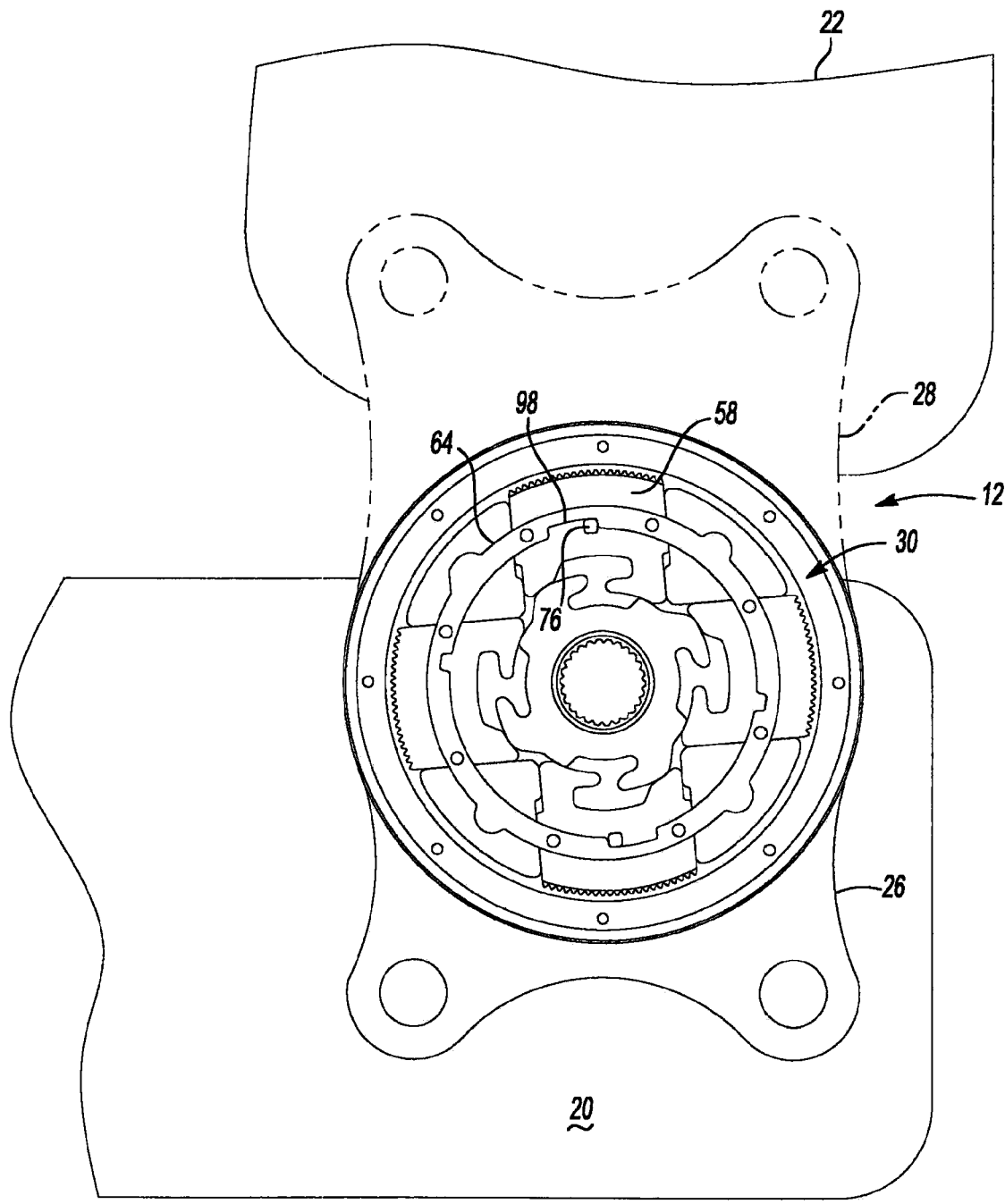
FIG. 10 is a partial side view of a seat assembly incorporating a recliner mechanism in accordance with the principles of the present disclosure in an upright and locked position.

Subsequently actuating the hand lever 144 and pivoting the seatback 22 towards the upright position beyond the angular range R2 of the dump recesses 100 may allow the user to release the hand lever 144 as the guide surfaces 101 slide against the dump bosses 76 (FIG. 10). Continued pivoting of the seatback 22 towards the upright position causes the dump bosses 76 to be received within the home recesses 98, which allows the pawls 58 to be urged into engagement with the ratchet plate 28 and allows the seatback to be locked in the upright position.

The shape of the dump bosses 76 (i.e., D-shaped, square, or rectangular) allow the pawls 58 to return to engagement with the ratchet plate 28 almost immediately upon entering the home recess 98 due to the sharp edge of each shape. Such rapid reengagement of the pawls 58 with the ratchet plate 28 returns the seatback 22 to a fixed position relative to the seat bottom 20 positively and quickly when the seatback 22 is sufficiently rotated relative to the seat bottom 20 (i.e., when the dump boss 76 opposes the home recess 98 due to sufficient rotation of the ratchet plate 28) and ensures that the pawls 58 are returned to a desired lock position relative to the ratchet plate 28. Such rapid return of the pawls 58 is further facilitated by the protruding features 71 and/or ring 73 of the cam 60, which allow the cam 60 to rapidly respond and urge the pawls 58 toward the ratchet plate 28 when the dump bosses 76 oppose the home recess 98.

The torque load imposed on the ratchet plate 28 is carried mostly by the overlap on the ratchet plate 28 immediately adjacent to the pawls 58, and generally not on an entire circumference of the overlap between the ratchet plate 28 and the pawls 58. As such, additional pawls 58 may allow the ratchet plate 28 to carry more torque by more effectively using the torque capacity of the entire circumference of the overlap. Alternatively, for the same torque load, additional pawls 58 may allow for thinner pawls 58, ratchet plates 28, and/or guide plates 26.

Utilizing additional components generally has an adverse economic result due to the costs of handling and manufacturing the multiple components. However, decreasing labor costs and/or automation have recently driven manufacturing costs down, thereby allowing use of multiple components.

Reducing the weight and/or size of individual components of the recliner mechanism 12, while concurrently holding a given torque, has usually resulted in use of high-strength alloys that are difficult to fineblank. Many conventional recliner mechanisms use nitrocarburized alloys such as SAE 1015-1020, which are very easy to fineblank. SAE 4130 is a harder material but, as such, is more difficult to fineblank. SAE 1040-1060 also provide good strength characteristics but are difficult to fineblank and may become brittle and distorted after heat treatment.

The most challenging fineblanking operation in typical recliner mechanism designs involves forming the teeth of both the pawls and ratchet plate. In fineblanking operations, difficulty increases as individual part thicknesses increase, as the tip/root radii decrease, and as the included angles decrease.

As pawl and ratchet plate teeth are formed smaller, the tip and root radii become more important to the design. While it is tempting to sharpen the tips/roots, as a practical matter, the current root radius on the components is defined by the typical wire diameter used in the wire EDM machines used to make tooling elements (at about 0.15 mm). The tip radius is generally defined to clear the root.

Furthermore, during a production run, chipping of the tooth-generating features in the tooling is usually a limiting factor. Sharper tip/root radii worsen this condition, thereby necessitating use of expensive and uncommon materials for tooling elements.

Regardless of the size of the recliner mechanism, the range for acceptable tooth included angles remains roughly 40 degrees to 70 degrees, with most designs in the 50-65 range. As the included angle grows past 70 degrees, torque capacity declines as the teeth create a high separation force. Conversely, too low of an angle may result in tooth shear.

Conventional round recliner mechanisms typically include an outer diameter substantially equal to 88 mm. While such conventional recliner mechanisms adequately carry 2000 Nm to 4000 Nm loads, such recliner mechanisms are relatively large and heavy and, as such, are difficult and costly to manufacture. Reducing the overall outer diameter of a conventional round recliner mechanism to substantially 66 mm reduces the overall size, weight, and cost while still allowing the recliner mechanism to handle a 2000 Nm load.

A pitch diameter (PD) of 55 mm (roughly 80 percent of a conventional recliner mechanism) having four pawls 58 and a ratchet plate 28 formed from SAE 8620 requires roughly a 2.4 mm thickness on the pawls 58, 84 total pawl teeth, about 3.5 mm thickness on the ratchet plate 28 and about 3.5 mm thickness on the guide plate 26 to carry a 2000 Nm load. The above configuration yields a recliner mechanism 12 having an outer diameter of substantially 65.8 mm (i.e., approximately 80 percent of an outer diameter of a conventional round recliner mechanism).

At a PD of approximately 55, the fineblanking feasibility increase of the reduced thickness helps compensate for the reduction of the tooth included angle from approximately 62 degrees to approximately 52 degrees. Tooth height may be reduced slightly to allow tip and root radii to remain essentially unchanged while holding a two-degree increment of recline. A larger increment may improve fineblanking feasibility somewhat, but two degrees is an established industry standard that is small enough to achieve high customer satisfaction.

In summary, the recliner mechanism 12 may include an outer diameter substantially equal to 66 mm. The reduction in outer diameter results in a weight reduction of approximately 200 g when compared to a conventional round recliner mechanism while still carrying a 2000 Nm load.

Figure 9:
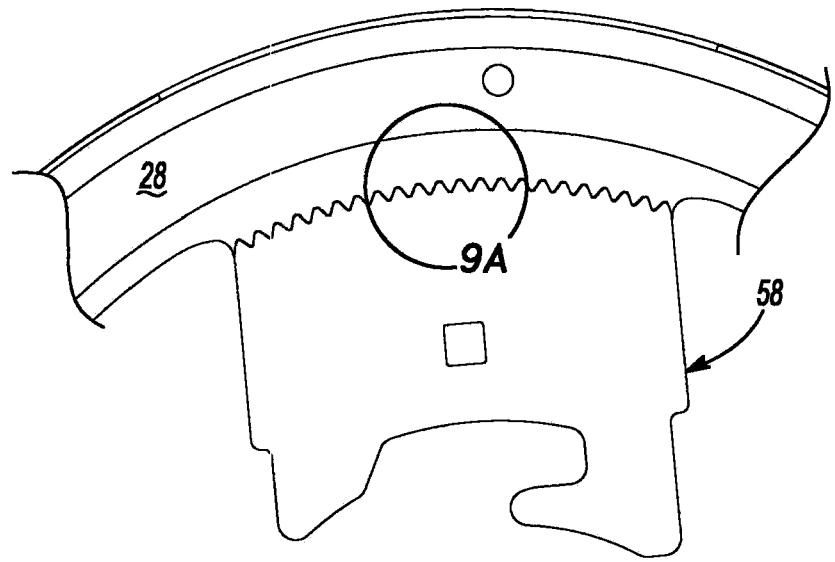
FIG. 9 is a schematic representation of a tooth profile of a pawl and a ratchet plate of a recliner mechanism in accordance with the principles of the present disclosure.
Figure 9A:
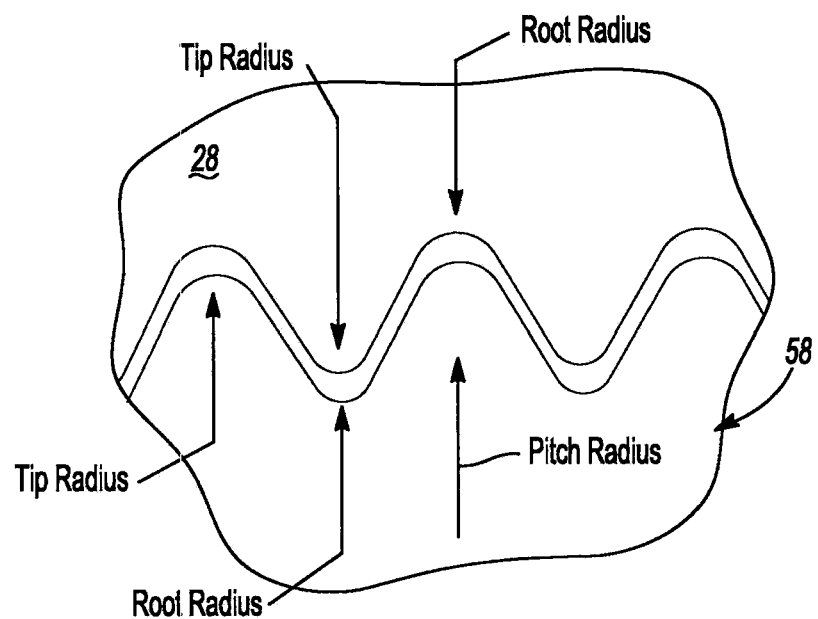
FIG. 9A is a detailed view of the tooth profile of FIG. 9.

With reference to FIGS. 9 and 9A, the following parameters are provided that yield a recliner mechanism 12 that is able to carry a 2000 Nm load and has an outer diameter substantially equal to 66 mm. The recliner mechanism 12 includes four pawls to effectively distribute load to the ratchet plate 28 and utilizes an alloy such as SAE 8620 for the pawls/ratchet plate that increases fineblank feasibility and reduces a thickness of each component. The recliner mechanism 12 also uses thinner pawls/ratchet plates/guide plates to improve fineblank feasibility, a tooth included angle that balances tooth shear and compression considerations while maintaining a two-degree recline increment, and a tooth tip/root radius at conventional levels to improve fineblank feasibility.

In one configuration, the 66 mm recliner mechanism 12 includes a pitch diameter between 35 mm and 65 mm. The root radius is substantially between 0.10 mm and 0.3 mm, as a root radius below 0.10 mm requires a sharp tool edge not suitable for long-running production. The included angle may be from forty to seventy degrees while the thickness of the pawls 58 is substantially between 1.5 mm and 3.0 mm.

The description of the present disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A recliner mechanism comprising:
a guide plate having a first boss, a second boss, a third boss, and a fourth boss, said bosses extending from said guide plate and each including a substantially planar surface and a stop extending from a side edge surface thereof;
a first channel disposed between said first boss and said second boss and bounded by said side edge surface of said first boss and by said side edge surface of said second boss, said stop of said first boss and said stop of said second boss extending into said first channel;
a second channel disposed between said third boss and said fourth boss and bounded by said side edge surface of said third boss and by said side edge surface of said fourth boss, said stop of said third boss and said stop of said fourth boss extending into said second channel;
a third channel disposed between said first boss and said fourth boss, said third channel having a substantially constant width along an entire length of said third channel and defined by said substantially planar surface of said first boss and by said substantially planar surface of said fourth boss;
a fourth channel disposed between said second boss and said third boss, said fourth channel having a substantially constant width along an entire length of said fourth channel and defined by said substantially planar surface of said second boss and by said substantially planar surface of said third boss;
a ratchet plate selectively rotatable relative to said guide plate and including a plurality of teeth encircling a central portion of said ratchet plate;
a first pawl, a second pawl, a third pawl, and a fourth pawl disposed between said guide plate and said ratchet plate and selectively moveable relative to said guide plate and said ratchet plate within said first channel, said second channel, said third channel, and said fourth channel, respectively, said pawls movable between a first position removed from engagement with said plurality of teeth to permit relative rotation between said guide plate and said ratchet plate and a second position in contact with said plurality of teeth to prevent relative rotation between said guide plate and said ratchet plate;
a rotatable cam including cam projections respectively associated with said first pawl, said second pawl, said third pawl, and said fourth pawl and disposed between said guide plate and said ratchet plate, said cam projections operable to engage respective ones of said pawls within a first plane to move said pawls upon rotation of said cam from said second position to said first position and operable to engage respective ones of said pawls within said first plane to move said pawls upon rotation of said cam from said first position to said second position; and a control ring fixed to said ratchet plate and in selective engagement with said pawls to prevent said pawls from moving from said first position to said second position;

wherein said first pawl and said second pawl engage said stops in said first channel and said second channel, respectively, in said first position to prevent over-rotation of said cam.

2. The recliner mechanism of claim 1, wherein said first channel is diametrically opposed to said second channel and said third channel is diametrically opposed to said fourth channel.

3. The recliner mechanism of claim 1, wherein each of said first pawl and said second pawl includes a post extending therefrom, said posts of said first pawl and said second pawl in selective engagement with said control ring to prevent said first pawl, said second pawl, said third pawl, and said fourth pawl from moving from said first position to said second position.

4. The recliner mechanism of claim 1, wherein said bosses each include a circumferential outer surface joining said substantially planar surface and said side edge surface.

5. The recliner mechanism of claim 4, wherein said plurality of teeth are in contact with said outer surface of said bosses to guide relative rotation between said guide plate and said ratchet plate.

6. The recliner mechanism of claim 1, wherein said control ring prevents said pawls from moving from said first position to said second position when said ratchet plate is rotated a predetermined amount relative to said guide plate.

7. The recliner mechanism of claim 1, wherein said cam moves said first pawl, said second pawl, said third pawl, and said fourth pawl from said first position to said second position when rotated in a first direction and from said second position to said first position when rotated in a second, opposite direction.

8. A seat assembly comprising:
a seat bottom;
a seatback rotatably supported by said seat bottom; and
a recliner mechanism disposed proximate to a junction of said seat bottom and said seatback and operable to selectively prevent rotation of said seatback relative to said seat bottom, said recliner mechanism comprising:
a guide plate attached to one of said seat bottom and said seatback and including a first boss, a second boss, a third boss, and a fourth boss, said bosses extending from said guide plate and each including a substantially planar surface and a stop extending from a side edge surface thereof;
a first channel disposed between said first boss and said second boss and bounded by said side edge surface of said first boss and by said side edge surface of said second boss, said stop of said first boss and said stop of said second boss extending into said first channel;
a second channel disposed between said third boss and said fourth boss and bounded by said side edge surface of said third boss and by said side edge surface of said fourth boss, said stop of said third boss and said stop of said fourth boss extending into said second channel;
a third channel disposed between said first boss and said fourth boss, said third channel having a substantially constant width along an entire length of said third channel and defined by said substantially planar surface of said first boss and by said substantially planar surface of said fourth boss;
a fourth channel disposed between said second boss and said third boss, said fourth channel having a substantially constant width along an entire length of said fourth channel and defined by said substantially planar surface of said second boss and by said substantially planar surface of said third boss;
a ratchet plate selectively rotatable relative to said guide plate and attached to the other of said seat bottom and said seatback, said ratchet plate including a plurality of teeth encircling a central portion of said ratchet plate;
a first pawl, a second pawl, a third pawl, and a fourth pawl disposed between said guide plate and said ratchet plate and selectively moveable relative to said guide plate and said ratchet plate within said first channel, said second channel, said third channel, and said fourth channel, respectively, said pawls movable between a first position removed from engagement with said plurality of teeth to permit relative rotation between said guide plate and said ratchet plate and a second position in contact with said plurality of teeth to prevent relative rotation between said guide plate and said ratchet plate;
a rotatable cam including cam projections respectively associated with said first pawl, said second pawl, said third pawl, and said fourth pawl and disposed between said guide plate and said ratchet plate, said cam projections operable to engage respective ones of said pawls within a first plane to move said pawls upon rotation of said cam from said second position to said first position and operable to engage respective ones of said pawls within said first plane to move said pawls upon rotation of said cam from said first position to said second position; and
a control ring fixed to said ratchet plate and in selective engagement with said pawls to prevent said pawls from moving from said first position to said second position;
wherein said first pawl and said second pawl engage said stops in said first channel and said second channel, respectively, in said first position to prevent over-rotation of said cam.

9. The seat assembly of claim 8, wherein said first channel is diametrically opposed to said second channel and said third channel is diametrically opposed to said fourth channel.

10. The seat assembly of claim 8, wherein each of said first pawl and said second pawl includes a post extending therefrom, said posts of said first pawl and said second pawl in selective engagement with said control ring to prevent said first pawl, said second pawl, said third pawl, and said fourth pawl from moving from said first position to said second position.

11. The seat assembly of claim 8, wherein said bosses each include a circumferential outer surface joining said substantially planar surface and said side edge surface.

12. The seat assembly of claim 11, wherein said plurality of teeth are in contact with said outer surface of said bosses to guide relative rotation between said guide plate and said ratchet plate.

13. The seat assembly of claim 8, wherein said control ring prevents said pawls from moving from said first position to said second position when said ratchet plate is rotated a predetermined amount relative to said guide plate.

14. The seat assembly of claim 8, wherein said cam moves said first pawl, said second pawl, said third pawl, and said fourth pawl from said first position to said second position when rotated in a first direction and from said second position to said first position when rotated in a second, opposite direction.

* * * * *